(12) United States Patent
Hoffman

(10) Patent No.: US 11,669,313 B2
(45) Date of Patent: *Jun. 6, 2023

(54) FAST COMPILING SOURCE CODE WITHOUT DEPENDENCIES

(71) Applicant: PAYPAL, INC., San Jose, CA (US)

(72) Inventor: Abraham Richard Hoffman, Mesa, AZ (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,409

(22) Filed: Sep. 30, 2021

(65) Prior Publication Data

US 2022/0019417 A1 Jan. 20, 2022

Related U.S. Application Data

(63) Continuation of application No. 16/912,517, filed on Jun. 25, 2020, now Pat. No. 11,200,038.

(51) Int. Cl.
*G06F 9/44* (2018.01)
*G06F 8/41* (2018.01)
(Continued)

(52) U.S. Cl.
CPC .............. *G06F 8/447* (2013.01); *G06F 8/425* (2013.01); *G06F 8/54* (2013.01); *G06F 8/71* (2013.01); *G06F 16/9027* (2019.01)

(58) Field of Classification Search
CPC .................................................. G06F 8/40–76
(Continued)

(56) References Cited

U.S. PATENT DOCUMENTS 5,640,562 A 6/1997 Wold et al.
7,386,844 B2 6/2008 Heishi et al.
(Continued)

FOREIGN PATENT DOCUMENTS

WO 2020021047 A1 1/2020

OTHER PUBLICATIONS

M. Gregor and J. Spalek, "Using LLVM-based JIT compilation in genetic programming," 2016 ELEKTRO, 2016, pp. 406-411, doi: 10.1109/ELEKTRO.2016.7512108.*
(Continued)

*Primary Examiner* — Francisco J Aponte
(74) *Attorney, Agent, or Firm* — Haynes and Boone, LLP

(57) ABSTRACT

Techniques for an ultra-fact software compilation of source code are provided. A compiler receives software code and may divide it into code sections. A map of ordered nodes may be generated, such that each node in the map may include a code section and the order of the nodes indicates an execution order of the software code. Each code section may be compiled into an executable object in parallel and independently from other code sections. A binary executable may be generated by linking executable objects generated from the code sections. The methodology significantly differs from existing source code compilation techniques because conventional compilers build executable sequentially, whereas the embodiments divide the source code into multiple smaller code sections and compile them individually and in parallel. Compiling multiple code sections improves the compilations in order of magnitude from conventional techniques.

20 Claims, 14 Drawing Sheets

(51) Int. Cl.
*G06F 8/71* (2018.01)
*G06F 16/901* (2019.01)
*G06F 8/54* (2018.01)

(58) Field of Classification Search
USPC .......................................................... 717/140
See application file for complete search history.

(56) References Cited

U.S. PATENT DOCUMENTS

| | | | |
|---|---|---|---|
| 7,426,721 | B1 | 9/2008 | Saulpaugh et al. |
| 7,549,042 | B2 | 6/2009 | Glaum et al. |
| 7,577,822 | B2 | 8/2009 | Vorbach |
| 7,698,697 | B2 | 4/2010 | Grcevski et al. |
| 7,774,588 | B2 | 8/2010 | Samba et al. |
| 7,926,046 | B2 | 4/2011 | Halambi et al. |
| 7,971,201 | B2 | 6/2011 | Kasama |
| 8,291,398 | B2 | 10/2012 | Kawahito et al. |
| 8,522,234 | B2 | 8/2013 | Sareen et al. |
| 8,924,952 | B1 | 12/2014 | Hou |
| 9,182,957 | B2 | 11/2015 | Craymer |
| 9,442,709 | B1 | 9/2016 | Delker et al. |
| 9,459,848 | B1 | 10/2016 | Horie et al. |
| 9,465,608 | B2 | 10/2016 | Araya et al. |
| 9,658,855 | B2 | 5/2017 | Ueno et al. |
| 9,715,376 | B2 | 7/2017 | Wang et al. |
| 9,778,844 | B2 | 10/2017 | Balakrishnan et al. |
| 9,864,590 | B2 | 1/2018 | Craymer, III |
| 9,910,660 | B2 | 3/2018 | Muench-Casanova et al. |
| 9,971,586 | B2 | 5/2018 | An et al. |
| 9,996,328 | B1 | 6/2018 | Kluss |
| 9,996,696 | B2 * | 6/2018 | Baji-Gál ................ G06F 21/577 |
| 10,169,013 | B2 * | 1/2019 | Chen ..................... G06F 8/4442 |
| 10,203,968 | B1 | 2/2019 | Lawson |
| 10,242,419 | B2 | 3/2019 | Sathe |
| 10,268,497 | B2 | 4/2019 | Rong et al. |
| 10,305,956 | B2 | 5/2019 | Elsner |
| 10,310,869 | B2 | 6/2019 | Tsuchiya et al. |
| 10,365,902 | B2 | 7/2019 | Slesarenko et al. |
| 10,817,157 | B2 | 10/2020 | Kuchibhotla et al. |
| 10,901,715 | B1 * | 1/2021 | Raiman ................. G06F 9/4552 |
| 10,956,137 | B2 | 3/2021 | Waltenberg et al. |
| 11,226,799 | B1 * | 1/2022 | Sundaresan ......... G06F 9/45516 |
| 11,301,218 | B2 * | 4/2022 | Elango ..................... G06F 8/30 |
| 2004/0068716 | A1 | 4/2004 | Stevens |
| 2005/0102665 | A1 | 5/2005 | Barta et al. |
| 2005/0132179 | A1 | 6/2005 | Glaum et al. |
| 2005/0132350 | A1 | 6/2005 | Markley et al. |
| 2005/0160104 | A1 | 7/2005 | Meera et al. |
| 2006/0123410 | A1 | 6/2006 | Kapoor |
| 2007/0113066 | A1 | 5/2007 | Samba et al. |
| 2008/0177994 | A1 | 7/2008 | Mayer |
| 2008/0189698 | A1 | 8/2008 | Sareen et al. |
| 2010/0125839 | A1 | 5/2010 | Gebis et al. |
| 2010/0325608 | A1 | 12/2010 | Radigan |
| 2011/0145081 | A1 | 6/2011 | Tomchek et al. |
| 2013/0191817 | A1 * | 7/2013 | Vorbach ................. G06F 8/452 717/150 |
| 2014/0379134 | A1 | 12/2014 | Tsuchiya et al. |
| 2015/0040113 | A1 | 2/2015 | Muench-Casanova et al. |
| 2015/0331694 | A1 | 11/2015 | Balakrishnan et al. |
| 2016/0085536 | A1 | 3/2016 | An et al. |
| 2016/0170726 | A1 | 6/2016 | Lee et al. |
| 2017/0060602 | A1 | 3/2017 | Self et al. |
| 2018/0157471 | A1 | 6/2018 | Venkataramani et al. |
| 2019/0042217 | A1 * | 2/2019 | Glossop ................. G06F 8/441 |
| 2020/0201526 | A1 | 6/2020 | Kuchibhotla et al. |
| 2020/0278848 | A1 | 9/2020 | Ebcioglu et al. |
| 2020/0310768 | A1 * | 10/2020 | Zhang ....................... G06F 8/43 |
| 2021/0004213 | A1 | 1/2021 | Eltantawy et al. |
| 2021/0064352 | A1 | 3/2021 | Drepper |
| 2021/0081188 | A1 | 3/2021 | Rajagopalan et al. |
| 2022/0147812 | A1 * | 5/2022 | Ming Chang .......... G06N 3/105 |

OTHER PUBLICATIONS

Adamski D., et al., "Polyhedral Source-to-Source Compiler," MIXDES 2016, 23rd International Conference "Mixed Design of Integrated Circuits and Systems", Jun. 23-25, 2016, 6 pages.

International Application No. PCT/US2021/038207, International Search Report and Written Opinion dated Jul. 16, 2021, 8 pages.

Baumann A., et al., "Improving Dynamic Update for Operating Systems," SOSP '05: Proceedings of the Twentieth ACM Symposium on Operating Systems Principles, Oct. 2005, Retrieved from Internet URL: https://dl.acm.org/, Retrieved on Dec. 9, 2021, 11 pages.

Faneca C., et al., "DETIboot: A Fast, Wireless System to Install Operating Systems on Students Laptops," Proceedings of the Second International Conference on Advances In Computing, Electronics and Communication (ACEC 2014), Retrieved from Internet URL: https://www.researchgate.net/publication/267511418_DETIboot_A_fast_wireless_system_to_install_operating_systems_on_students_laptops, Retrieved on Dec. 9, 2021, 7 pages.

Sapuntzakis P.C., et al., "Optimizing the Migration of Virtual Computers," OSDI '02: Proceedings of the 5th Symposium on Operating Systems Design and Implementation, Retrieved from Internet URL: https://dl.acm.org/, Dec. 2002, Retrieved on Dec. 9, 2021, 14 pages.

International Preliminary Report on Patentability for Application No. PCT/US2021/038207, dated Jan. 5, 2023 7 pages.

Office Action, United States U.S. Appl. No. 17/682,375, dated Nov. 9, 2022, 11 pages.

* cited by examiner

Canonical Func in C

802 {
804A — int f () {
804B — int a = 0;
804C — a = (a * 5);
804D — return a;
}

FIG. 8

Hyper-morphed Func in C

NODE0: int f (<EDGE0>) {<EDGE1>}
NODE1: int a = 0;  APPEND -> <EDGE1>
NODE2: a = (a * 5) APPEND -> <EDGE1>
NODE3: return a;   APPEND -> <EDGE1>

FIG. 9

Hyper-morphed Code Generation AST / ASM

1002A — -- 0 -- f: push rbp mov rbp, rsp nop pop rbp ret

1002B — -- 1 -- a: .zero 4

1002C — -- 2 -- a: .long 5

1002D — -- 3 -- Identified as overlapping with `0` and discarded.

Hyper-morphed Resultant Objects

Hyper-morphed Map-Linker

A.

1102A  `0.o` <- mapped to stack ->
1102B  `1.o` <- mapped to stack ->
1102C  `2.o` +
1204  libs +
1206  objects =
702  executable

FIG. 12

FAST COMPILING SOURCE CODE WITHOUT DEPENDENCIES

CROSS REFERENCE TO RELATED APPLICATIONS

This application is a continuation of U.S. application Ser. No. 16/912,517, filed Jun. 25, 2020. This application is also related to U.S. application Ser. No. 16/912,507, filed Jun. 25, 2020. Both of which are incorporated herein by reference in their entirety.

TECHNICAL FIELD

The disclosure generally relates to fundamental changes in software operations and allowing faster actions by changing the way software dependencies operate, particularly in some embodiments that relate to installing and updating operating systems and compiling source code into a binary executable.

BACKGROUND

Conventionally, an operating system is installed by sequentially installing multiple components on a computing device. As components are installed, components transition from an uninstalled to installed state. Further, installation of subsequent components often depends on the previous components transitioning from an uninstalled to the installed states. E.g. if component B is dependent on the successful install of component A, the install for component B cannot be completed (or in many cases not even started) until component A is finished. Because of these dependencies, the operating system installation process is highly sequential and is difficult to parallelize. Further, if the installation of one of components fails, the installation of components subsequent to the one blocking component also fails. This causes the entire installation process to fail which leads to wasted installation and processing time.

Conventionally, a compiler may compile source code in a sequential process. In the sequential process, the compiler performs a lexical analysis of the entire source code, generates an abstract syntax tree from the entire source code, generates an assembly code from the abstract syntax tree and converts the assembly code into a binary executable. This highly sequential process results in significant delays in compilation times. Applicant recognizes that with respect to operating system installs, source code compiling, and software operations generally, there is an opportunity to dramatically speed up certain actions that are dependent on the completion of other prior actions.

BRIEF DESCRIPTION OF THE DRAWINGS

FIG. 8 is a diagram of a source code, according to an embodiment.

FIG. 9 is a diagram of an ordered map with nodes that include code sections from the source code, according to an embodiment.

FIG. 10 is a diagram of an assembly code generated from the code sections, according to an embodiment.

FIG. 11 is a diagram of executable objects generated from the code sections, according to an embodiment.

FIG. 12 is a diagram of an executable generated from the executable objects, according to an embodiment.

Figure 1:
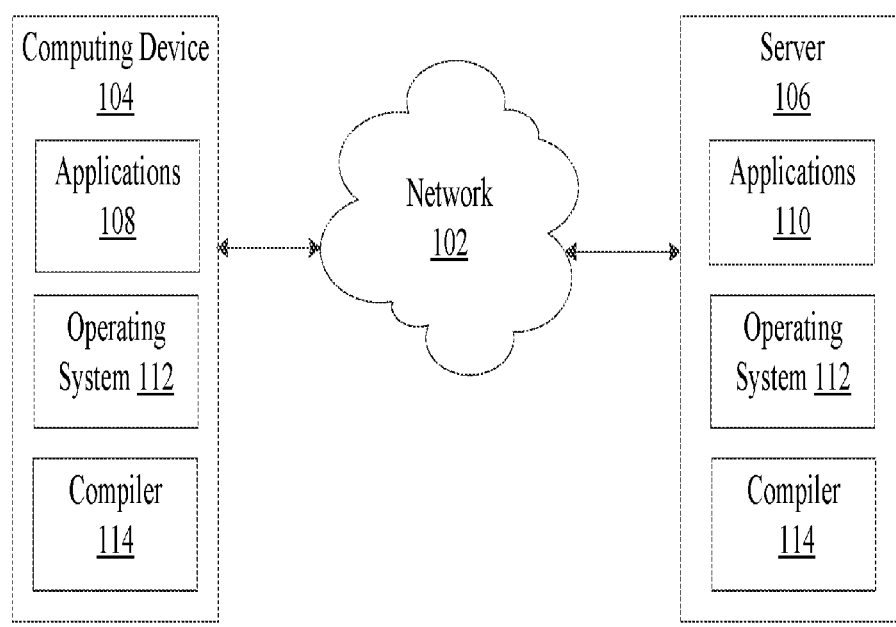
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments describe fundamental changes to conventional software operations that result in geometric decrease in magnitude in software operations that, for example, install or update an operating system or compile source code into a binary executable. This may be accomplished by distilling typically aggregated components into the building blocks and then acting on the building blocks individually. By acting on the building blocks individually, the building blocks may be executed or compiled separately and in parallel from other building blocks and without external dependencies, such as dependencies on other building blocks. As each building block is executed or compiled the building block transitions from an initial state to a final state. Once all blocks have transitioned to the final state, the entire global state may shift to a final global state. The embodiments below apply the above methodology to software operations that perform installation of an operating system, an update of an operation system, and execution or compilation of any form of source code into a binary executable.

Overview of Ultra-Fast Operating System Installation

Different embodiments describe a novel installation process that reduces operating system installation times, such as from twenty-five minutes to approximately fifteen seconds on the same or similar computing device and using the same or similar hardware. Conventionally, the components of an operating system are installed by sequentially copying the components initially stored in a memory storage such as a compact disk or a universal serial bus (USB) drive to a computing device or another device that runs the operating system. As the components are installed, the components transition from an uninstalled state to an installed state. The components are highly dependent on other components successfully transitioning from an uninstalled state to an installed state. Because of inter-dependencies between the components, if one of the components fails, then the entire installation operating system installation process fails.

For example, suppose an operating system is installed in a conventional, sequential manner. Suppose further that the operating system includes six components, such as component A, component B, component C, component D, component E, and component F. The components maybe files, libraries, executable programs, etc. During installation, each of the components A-F transitions from an uninstalled state to an installed state. Suppose the installation of component B depends on component A transitioning from an uninstalled state to an installed state, while component C may transition from an uninstalled state to an installed state independently from components A and B. However, while component C can mostly transition independently from components A and B from an uninstalled state to an installed state, component C cannot switch into an installed state until both components A and B transition into the installed state. Further, for the operating system to transition from an uninstalled state to an installed state, all components A-F must transition to the installed states. In this case, if component A does not transition from the uninstalled state to the installed state, neither will component B. Component C also may not transition to an installed state because components A and B have not transitioned to the installed state. Accordingly, the risk of time and processor cycle loss for component B is higher than for component A, and the risk of time and processor cycle loss for component C is higher than for components A and B.

In another example, suppose component E can be installed only after components A-D have been installed and have transitioned from an uninstalled state to an installed state. However, component E fails to transition from an uninstalled state to an installed state. In this case, the risk of time and processor cycle loss is greater for component E than for components A-D. Similarly, if component F depends on component E and the installation of component F fails, the risk of time and processor cycle loss is greater for component F than for component E.

The embodiments herein describe a new operating system installation process that decouples sequential installation of components in the operating system. More particularly, the present techniques allow traditional dependencies to be broken so that when a component B is reliant on completion of a component A, component B can instead be installed independently of component A. In this way, installation of individual components is independent from other components. The new operating system installation process utilizes a disk image container and a definition. A disk image container may store components, e.g. files, libraries, etc., that comprise an operating system. A definition of the operating system includes key-value pairs where a key is a name of a component and a value is a location of the operating system component in memory. An operating system that executes on a computing device and installs the new operating system may receive the container with the components and the definition. Once received, the operating system assigns an uninstalled state to the components and a global uninstalled state to the new operating system. The operating system installs the new operating system by copying components from the container to the respective locations specified in the definition to a memory of a computing device. The components are independent of each other and may be copied in parallel. As each component is copied to the memory, the component transitions from an uninstalled state to an installed state. If one or more components fail, then each component may be corrected independently from other components and without affecting the installation of other components. Once all components are copied to the memory and are switched to the installed state, the operating system switches the global uninstalled state to the installed state which indicates that the new operating system is installed on the computing device. These operations above may occur in various embodiments and should not be assumed as required for any particular embodiment.

Overview of Fast Compiling Source Code

The embodiments also disclose a novel compilation process that compiles source code written in a programming language into a binary executable. Unlike conventional compilers, the compiler compiles multiple sections of the source code using a novel parallel technique. In the embodiments, the compiler receives source code and divides the source code into code sections. The compiler then generates an ordered map where nodes include the code sections, one code section per node, in some embodiments. The nodes are also appended with edges that indicate the order of the nodes. The order indicates an execution order of the code sections as specified by the software code. For each node, the compiler performs a lexical analysis of the code snippet, generates an abstract syntax tree from the code section based on the lexical analysis, traverses the abstract syntax tree to generate a low-level code, and generates an executable object from the low-level code. The compiler may generate the executable objects for each node in parallel with other nodes. Once the compiler generates the executable objects from all code sections, the compiler may link the executable objects in an order indicated in the ordered map to generate a binary executable. The binary executable may be an executable of an application that executes on a computing device.

In an embodiment, once the compiler divides the source code into code sections, the compiler may assign an uncompiled state to each code snippet. The compiler may also assign an uncompiled global state to the source code. When the compiler generates an executable object for a corresponding code snippet, the compiler may switch the uncompiled state to a compile state for the code snippet. Once the compiler switches all code sections to a compiled state, the compiler generates a binary executable and switches that global state to a compiled global state.

System that Supports Ultra-Fast Operating System Installation and Update and Fast Compiling Source Code FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104 and server(s) 106. Computing devices 104 may be portable and non-portable electronic devices under the control of a user and configured to transmit, receive, and manipulate data from one or more servers 106 over network 102. Example computing devices 104 include desktop computers, laptop computers, tablets, smartphones, wearable computing devices, eyeglasses that incorporate computing devices, implantable computing devices, etc.

Computing devices 104 may include one or more applications 108. Applications 108 may be pre-installed on the computing devices 104, installed on the computing devices 104 using portable memory storage devices, such as compact disks or thumb-drives, or be downloaded to the computing devices 104 from servers 106. Applications 108 may execute on computing devices 104 and receive instructions and data from a user, from server 106.

Example applications 108 may be payment transaction applications. Payment transaction applications may be configured to transfer money world-wide, receive payments for goods and services, manage money spending, etc. Further, applications 108 may be under an ownership or control of a payment service provider, such as PAYPAL®, Inc. of San Jose, Calif., USA, a telephonic service provider, a social networking service provider, and/or other service providers. Applications 108 may also be analytics applications. Analytics applications perform business logic, provide services, and measure and improve performance of services and functions of other applications that execute on computing devices 104 based on current and historical data. Applications 108 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 108 may be location detection applications, such as a mapping, compass, and/or global positioning system (GPS) applications, social networking applications and/or merchant applications. Additionally, applications 108 may be service applications that permit a user of computing device 104 to receive, request and/or view information for products and/or services, and also permit the user to purchase the selected products and/or services.

In an embodiment, applications 108 may utilize numerous components included in computing device 104 to receive input, store and display data, and communicate with network 102. Example components are discussed in detail in FIG. 4.

Server 106 may be a computer or a program that provides services and functionality to applications 108. Server 106 may receive requests with data from application 108, manipulate the data using an application 110, which is a server counterpart to application 108 and send a response back to applications 108.

To execute applications, in some embodiments, server 106 and computing device 104 may include an operating system 112. Operating system 112 may be system software that provides an interface between applications 108, 110, and computer hardware of computing devices 104 and servers 106. Typically, operating system 112 provides common system services to applications 108, 110 such as scheduling application tasks on hardware resources, allocating processor time and volatile and non-volatile memory utilized by applications 108, 110. In some embodiments, operating system 112 also manages hardware functions such as device components that are used for input and output (e.g. mouse and keyboard) of data and memory allocation. In other words, operating system 112 acts as an intermediary between computer hardware (discussed in FIG. 14) and applications 108, 110.

Prior to computing device 104 executing applications 108 or server 106 executing application 110, operating system 112 is installed on computing device 104 or server 106. Operating system 112 installation may include installing hundreds of components that make up operating system 112 on computing device 104 or server 106. An example component may include a file, library, etc.

Figure 2:
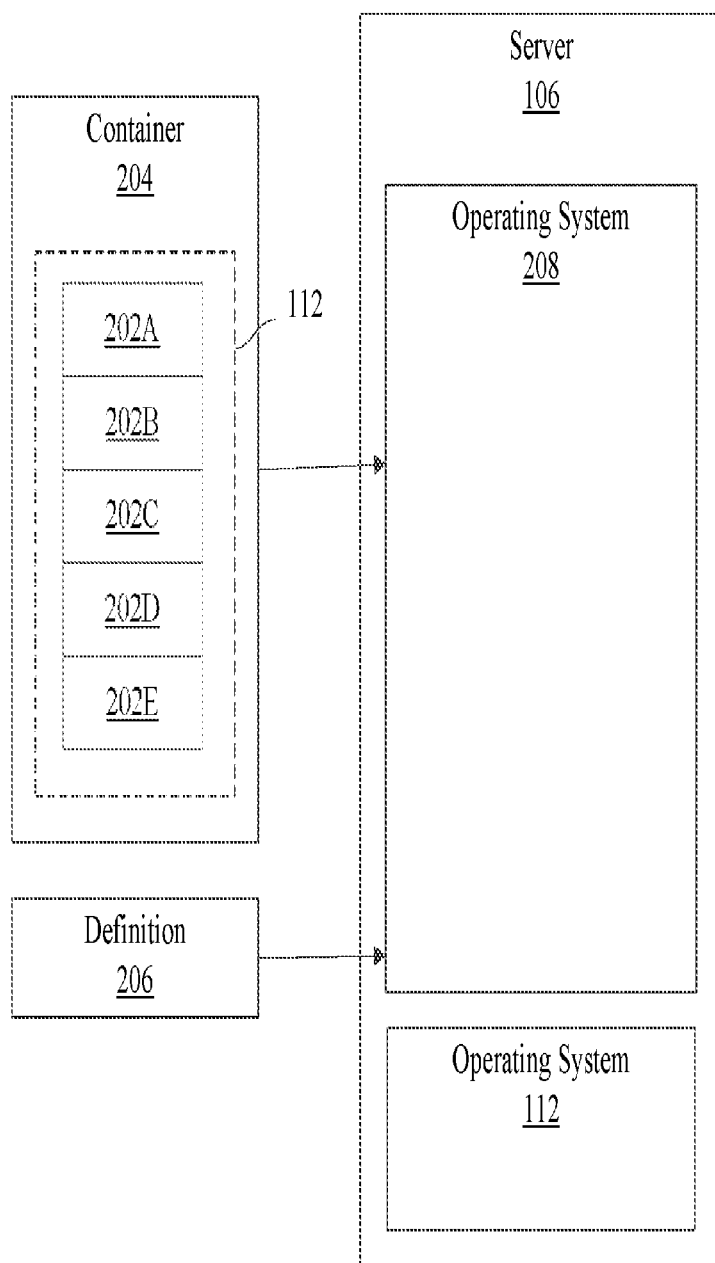
FIG. 2 is a block diagram for installing an operating system, according to an embodiment.

Unlike conventional operating system installation procedures, components of the operating system 112 may be installed irrespective of dependencies among each other. FIG. 2 is a block diagram 200 of a system that installs an operating system, according to some embodiments. Although the diagram 200 illustrates the operating system 112 installation process on server 106, the embodiments are also applicable to computing device 104. As illustrated in FIG. 2, operating system 112 may include components 202A, 202B, 202C, 202D and 202E (referred to herein as 202A-E) which are installed on server 106 before operating system 112 can execute on server 106. Components 202A-E may be stored in a container 204. Container 204 may be a disk image file such as a QEMU (Quick Emulator) Copy on Write (QCOW) or QCOW2. The disk image may be a file containing the contents and structure of a disk volume or data storage device, such as a hard disk drive, or another memory storage.

The system in diagram 200 also includes a definition 206. The definition 206 may define the location of components 202A-E in memory, such as a disk volume or data storage device. In other words, definition 206 defines the final installed state of components 202A-E when operating system 112 is installed on server 106.

In some embodiments, definition 206 may include multiple key-value pairs. The keys may correspond to the names of components 202A-E and the values may correspond to the location of the components 202A-E in memory. For example, one key-value pair may include a key that is a name of component 202A and a value that is a location of the component 202A in memory. Another key-value pair may include a key that is a name of component 202B and a value that is a location of component 202B in memory. In some instances, definition 206 may be in a JavaScript Object Notation (JSON) format. Further, definition 206 may also include key-value pairs in one or more blobs, such as JSON blobs. The blobs may be groupings of different components 202A-E. With respect to components 202A-E, an example definition 206 may be:

```
{OS_files : {
    "Component 202A" : "//location/component 202A"
    "Component 202B" : "//location/component 202B"
    "Component 202C" : "//location/component 202C"
    "Component 202D" : "//location/component 202D"
    "Component 202E" : "//location/component 202E"
} }
```

In some embodiments, server 106 may receive container 204 and definition 206 from another computing device connected to network 102 or from a portable memory storage, such as a thumb drive that may be connected to server 106.

In some embodiments, server 106 may include an operating system 208. Operating system 208 is already installed and executes on server 106. Server 106 may use operating system 208 to access components 202A-E included in container 204 to install operating system 112.

In some embodiments, operating system 208 may receive or access container 204 that includes components 202A-E of operating system 112 and definition 206. For example, operating system 208 may include an application programming interface (API) that receives a name of definition 206 and a name of container 204 and accesses definition 206 and container 204 from a memory within or coupled to server 106. At this point, operating system 208 may assign an uninstalled state to each component in components 202A-E and an uninstalled global state to operating system 112. Operating system 208 may move components 202A-E stored in container 204 to locations in memory identified in definition 206. The operating system 208 may move each one of components 202A-E independently of other components in components 202A-E, thus eliminating dependencies among components 202A-E.

For example, suppose installation of component 202B depends on installation of component 202A. If in a conventional installation component 202B cannot be installed until installation of component 202A completes, in the embodiments herein component 202A and component 202B may be installed in parallel and independently of each other and based on the assumption that installation of component 202A will be successful.

Suppose further that installation of component 202C depends on installation of component 202B, and installation of component 202E depends on installation of component 202D, and installation of component 202D depends on installation of component 202B. In a conventional installation, component 202B would not be installed until component 202A has been installed (i.e. copied to a designated location), and components 202C and 202D would not be installed until component 202B has been installed. Further, in a conventional installation, component 202E would not be installed until component 202D has been installed and component 202D would not be installed until component 202B has been installed. However, when components 202A-E are installed using operating system 208, component 202A may be installed in parallel with component 202B-E, component 202C may be installed in parallel with components 202A-B and 202C-E, component 202D may be installed in parallel with components 202A-C and 202E, etc. Further the dependencies between components 202A and 202B, components 202B and 202C, components 202B and 202D, and components 202D and 202E are disregarded. Instead, operating system 208 may assume that installation of components 202A-E will be successful and installs components 202A-E in parallel.

Once operating system 208 moves each component in components 202A-E to the location specified in definition 206, operating system 208 may transition the state of each component from an uninstalled state to an installed state. In the example above, operating system 208 may move component 202A in parallel with component 202B. Moving component 202A (and other components 202B-E) means copying component 202A (or other components 202B-E) from container 204 to a memory of a computing device that is specified in definition 206 according to various embodiments. However, operating system 208 completes moving component 202B before it completes moving component 202A. Once operating system 208 completes moving component 202B, operating system 208 may switch the uninstalled state associated with component 202B to an installed state, irrespective of the state of component 202A. Only once operating system 208 completes moving component 202A, does operating system 208 move the uninstalled state associated with component 202A to an installed state.

As discussed above, operating system 208 may move components 202A-E. Prior to the move, operating system 208 may assign an uninstalled state to each one of components 202A-E. As operating system 208 completes moving each one of components 202A-E, operating system 208 may transition the state of the each one of components 202A-E from uninstalled state to installed state. For example, once operating system 208 moves component 202A from container 204 to one or more locations specified in definition 206, operating system 208 may transition the state of component 202A from uninstalled state to installed state. Similarly, suppose operating system 208 next completes moving component 202C from container 204 to a location specified in definition 206, operating system 208 may then transition the state of component 202C from uninstalled state to installed state irrespective of whether components 202B and 202D-E have been moved. Operating system 208 may similarly transition the state from an uninstalled state to an installed state for each of components 202C-E as operating system 208 completes moving each of components 202C-E. For example, suppose operating system 208 completes moving component 202E before it completes moving components 202C and 202D. In this case operating system 208 may transition component 202E from an uninstalled to an installed state regardless of component 202E being dependent on component 202D.

In some embodiments, operating system 112 may also have a global state that is initially set to a global uninstalled state. Operating system 208 may transition the global state of operating system 112 to the installed state when all components 202A-E have transitioned to the installed state.

In some embodiments, operating system 208 may also track a component, such as component 202B, that has not been able to transition from an uninstalled state to the installed state. A failure in transitioning from an uninstalled state to an installed state may occur when a location in definition 206 that is associated with component 202B does not exist in memory. In this case, operating system 208 may display, e.g. using an API, the name of component 202B, the location in definition 206 and a reason for the failure. Upon receiving input via the API, such as a new location for component 202B, operating system 208 may again attempt to install component 202B at the new location. This is unlike conventional installations, where the entire operating system may be reinstalled from the beginning because the transition of a component from the uninstalled state to the installed state is dependent on the previous components transitioning from the uninstalled state to the installed state as discussed above.

In some embodiments, the speed of the operating system 208 copying components 202A-E from container 204 to the locations specified in definition 206 may depend on the hardware and software that executes on server 106. For example, suppose the processor on server 106 may execute three threads where each thread may copy one component from components 202A-E in parallel. In this case, operating system 112 may copy components 220A-C in parallel from container 204 to the respective locations specified in definition 206, and then copy components 202D-E in parallel.

Figure 3:
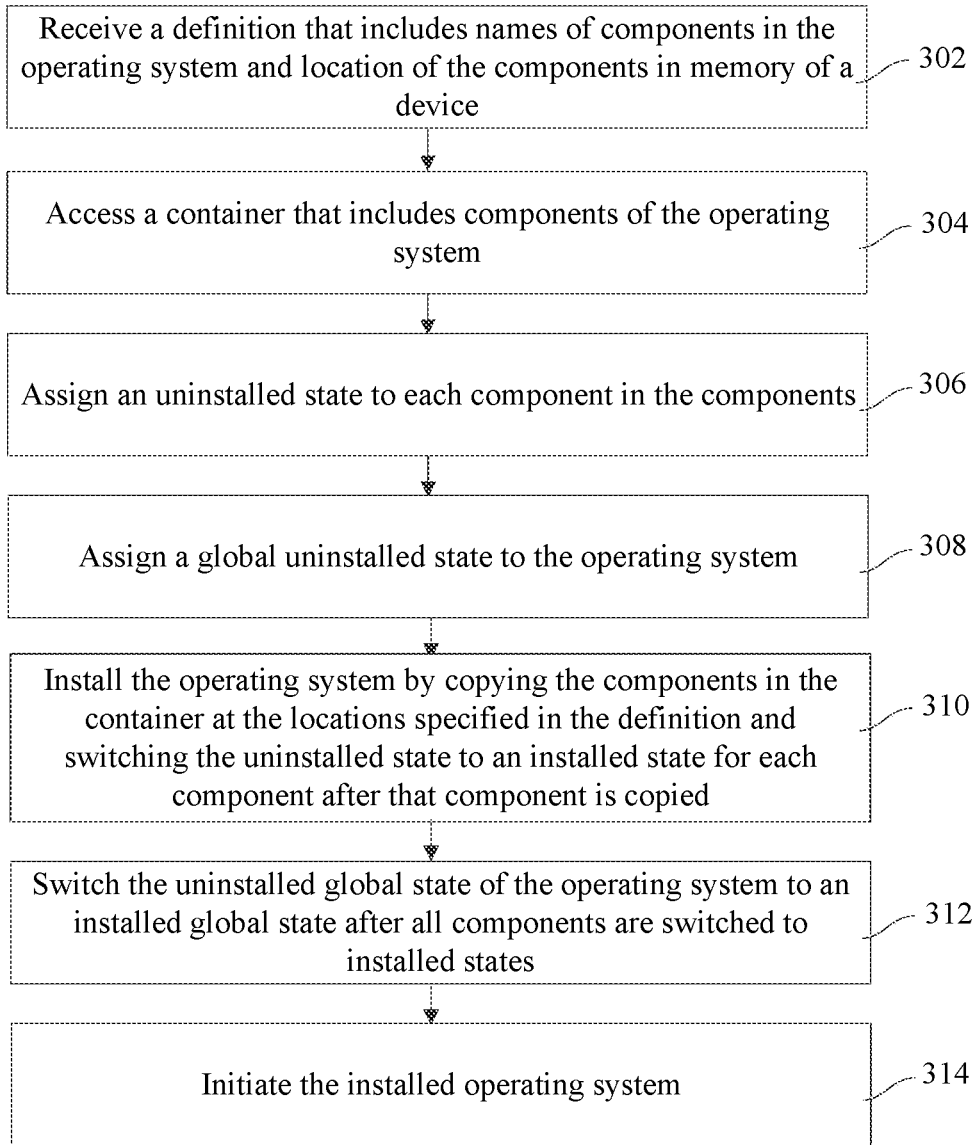
FIG. 3 is a flowchart of a method for installing an operating system, according to an embodiment.

FIG. 3 is a flowchart of a method 300 for installing an operating system, according to an embodiment. Method 300 may be performed using hardware and/or software components described in FIGS. 1-2. Note that one or more of the operations may be deleted, combined, or performed in a different order as appropriate.

At operation 302, a definition is received. For example, operating system 208 that installs operating system 112 may receive definition 206. As discussed above, definition 206 includes names of components 202A-E that are included in the operating system 112 and locations of components 202A-E in memory of server 106 or computing device 104. Definition 206 may include multiple key-value pairs where a key in a key-value pair may identify the name of one of components 202A-E and a value may identify a location in memory of the one of the components 202A-E. Definition 206 may be in a JavaScript Object Notation (JSON) format. In some embodiments, operating system 208 may receive definition 206 using an API.

At operation 304, a container is accessed. For example, operating system 208 may access container 204. Container 204 may include components 202A-E that may be files, libraries, executable files, etc., that are used by or are part of operating system 112. In some embodiments, container 204 may be a QCOW or a QCOW2 container that may include disk image files that are components 202A-E.

At operation 306, an uninstalled state is assigned to components. For example, operating system 208 may assign an uninstalled state to each component in components 202A-E. The uninstalled state may be in a binary form or another form. Further operation 306 may be included in operation 304.

At operation 308, a global uninstalled state is assigned. For example, operating system 208 may assign a global uninstalled state to operating system 112. The global state may be in a binary or another form. Notably operation 308 may be included in one of operations 302-306.

At operation 310, components are installed. For example, operating system 208 may copy components 202A-E from container 204 to a memory of computing device 104 or server 106. As discussed above, some or all components 202A-E may be copied in parallel and without dependencies on each other. As each component in components 202A-E is copied, operating system 208 may switch the state of the copied component from an uninstalled state to an installed state. The switch may occur when the component is copied and irrespective of whether other components have been copied or are still being copied. For example, if components 202A and 202B are copied in parallel, and the copying of component 202B completes before component 202A, then the uninstalled state of component 202B is switched to the installed state irrespective of the state of component 202A. Once the copying of component 202A completes, the uninstalled state of component 202A is switched to the installed state. Further if one of components 202A-E, e.g. component 202B, fails to install, operating system 208 may receive a new location or other instructions that may rectify the failure, and reinstall the failed component 202B without affecting the installation of components 202A and 202C-E.

At operation 312, a global state is transitioned to an installed state. For example, after all components 202A-E are transitioned to the installed state, operating system 208 transitions the global state of operating system 112 to an installed state.

At operation 314, the operating system is initiated. For example, the operating system 112 installed in operation 306 executes on computing device 104 or server 106.

The installation technique discussed in FIGS. 2 and 3 is a significant improvement over conventional operating system installation techniques. As discussed above, conventional operating system installation techniques install components sequentially and the subsequent components do not transition to an installed state until previous components have been installed and transitioned from uninstalled to installed states. For example, suppose operating system 112 is an "Ubuntu 16.04.3" operating system, which is known in the art. When installed in a conventional manner, the installation process of the Ubuntu 16.04.3 can take approximately 25 minutes on server 106. On the other hand, when components of the Ubuntu 16.04.3 are included in container 204 and definition 206 includes names and locations of the components in memory of server 106, the Ubuntu 16.04.3 may be installed in about 15 seconds on average on the same or similar server 106, which is almost a 1000% improvement over conventional installation techniques.

Going back to FIG. 1, in some embodiments, as operating system 112 executes on server 106 or computing device 104, a subset of components, such as files or libraries may be updated. In conventional updates, operating system 112 is terminated, the subset of components is updated, and then the operating system 112 is rebooted. However, when operating system 112 is terminated, applications 108, 110 cannot execute on computing device 104 or server 106 because applications 108, 110 do not have access to the hardware resources of computing device 104 or server 106. This means that application 108 or 110 may not provide application services to users or other applications. To minimize or eliminate the downtime on computing device 104 or server 106, the embodiments disclose a technique for updating components of operating system 112 without terminating operating system 112. In other words, components of operating system 112 may be updated while operating system 112 continues to execute on computing device 104 or server 106 and without rebooting operating system 112.

Downtime of computer servers during a software and/or hardware update is particularly relevant when those servers are running enterprise software at scale to support a business—e.g. to facilitate electronic payment transactions, or another service. If a set of 5,000 servers are being used for an enterprise, and a critical update patch becomes necessary to install on all those servers, and the update takes 10 minutes to patch, then that is 50,000 machine-minutes of unplanned downtime that will be required. In the case of enterprise system, this downtime may mean that additional temporary capacity has to be installed or acquired, users may have longer wait times, certain operations or transactions might fail during the downtime, etc. Such downtime is also consequential for new operating system installs as well (e.g. putting new or reformatted machines into service). Thus, reducing this downtime results in a higher system capacity to execute operations for one more services.

Figure 4:
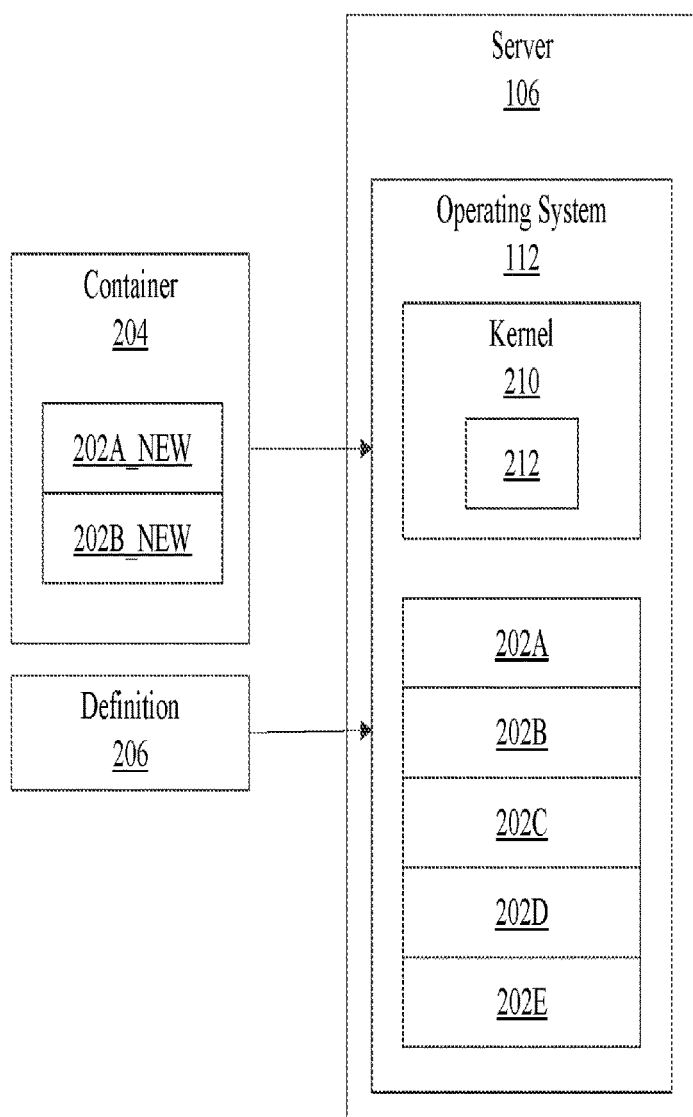
FIGS. 4 and 5 are block diagrams illustrating an update of an operating system, according to an embodiment.
Figure 5:
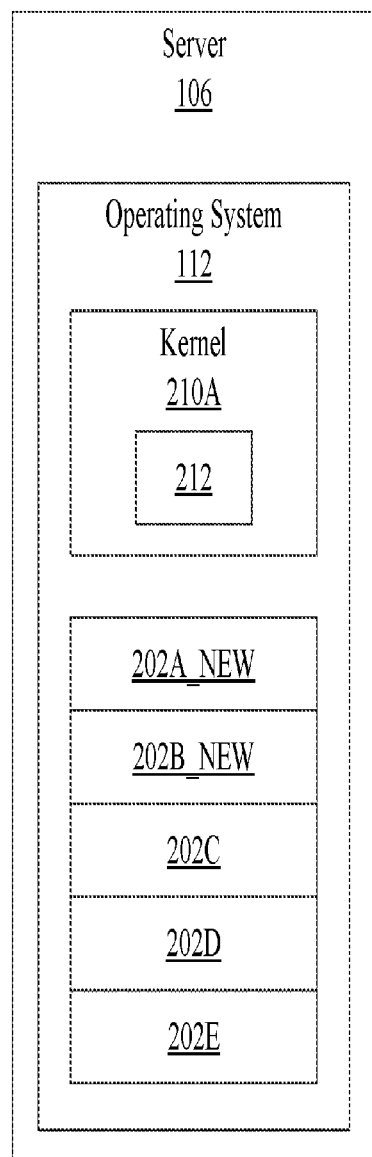

FIGS. 4 and 5 are block diagrams 400 and 500 for upgrading components of an operating system, according to some embodiments. FIG. 4 illustrates upgrading components of operating system 112 that executes on server 106 without rebooting operating system 112. Further, although embodiments are discussed with respect to server 106, the embodiments may also apply to computing device 104.

In FIG. 4, operating system 112 has previously been installed on server 106 and includes components 202A-E. In some embodiments, components 202A and 202B may be upgraded with components 202A_NEW and 202B_NEW. In this case, container 204 may be generated to include components 202A_NEW and 202B_NEW. Container 204 may be generated using server 106 or generated on another computing device and transmitted to server 106 over network 102 or a portable memory device. Additionally, definition 206 may define the names and locations of components 202A_NEW and 202B_NEW. As discussed above, definition 206 may include the names and locations of components 202A_NEW and 202B_NEW using key-value pairs.

In this example, operating system 112 receives container 204 and definition 206. Notably, operating system 112 is the operating system that executes on server 106 and supports application 110. Operating system 112 accesses components 202A_NEW and 202B_NEW in container 204 and copies components 202A_NEW and 202B_NEW to the respective locations indicated in definition 206 using the methodology discussed in FIG. 2.

Operating system 112 may include a component that is a kernel 210. Kernel 210 is a computer program that controls other components in operating system 112 and is stored in memory protected from other applications. Kernel 210 may handle input/output requests from applications 110, may translate these requests into processing instructions for a processor, and may handle memory and peripheral components, such as a keyboard, mouse, speakers, printers, monitors, etc. In some embodiments, kernel 210 may invoke a kernel execution function 212. Kernel execution function 212 may invoke a boot of a new kernel 210A (shown in FIG. 5 after loading to operating system 112) from the currently executing kernel 210. Kernel 210 may invoke the kernel execution function 212 using a kernel API. When kernel 210 invokes kernel execution function 212, kernel execution function 212 loads kernel 210A into memory of server 106, along with the components of operating system 112, such as new components 202A_NEW and 202B_NEW and existing components 202C-E. Once kernel 210A is booted and begins to execute within the operating system 112, kernel 210 may be terminated (e.g. no longer executing in memory). FIG. 5 illustrates new kernel 210A that executes within operating system 112 and uses new components 202A_NEW and 202B_NEW and existing components 202C-E. In this way, the component such as components 202A and 202B of the operating system 112 may be upgraded without first terminating operating system 112 and causing application 110 downtime.

Figure 6:
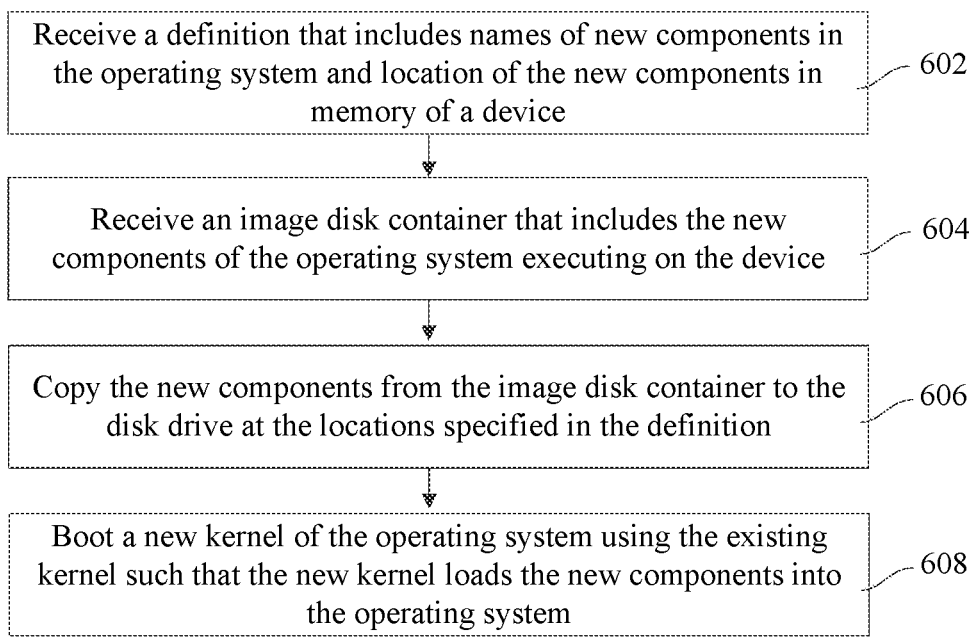
FIG. 6 is a flowchart of a method for updating an operating system, according to an embodiment.

FIG. 6 is a flowchart of a method 600 for upgrading an operating system, according to an embodiment. Method 600 may be performed using hardware and/or software components described in FIGS. 1-2 and 4-5. Note that one or more of the operations may be deleted, combined, or performed in a different order as appropriate.

At operation 602, a definition is received. As discussed above, operating system 112 that executes on server 106 receives definition 206 that includes the names of components 202A_NEW and 202B_NEW and the corresponding locations of components 202A_NEW and 202B_NEW.

At operation 604, a container is accessed. Container 204 may include components 202A_NEW and 202B_NEW that may be upgraded in operating system 112. As discussed above, components 202A_NEW and 202B_NEW may be files, libraries, executable files, etc., that are used by operating system 112. As also discussed above, the container may be a QCOW or a QCOW2 container.

At operation 606, components are upgraded. For example, operating system 112 may copy components 202A_NEW and 202B_NEW from container 204 to a memory. As discussed above, components 202A_NEW and 202B_NEW replace components 202A and 202B. As each components 202A and 202B is copied, operating system 208 may switch the copied component state from an uninstalled state to an installed state.

At operation 608, a new kernel is booted from an existing kernel. For example, while operating system 112 continues to execute, kernel 210 that is executing within operating system 112 boots new kernel 210A using kernel execution function 212. As new kernel 210A boots, new kernel 210A loads the new components 202A_NEW and 202B_NEW and existing components 202C-E into the kernel memory. In this way, components 202A-B may be upgraded in operating system 112 without shutting down operating system 112 which reduces application 110 downtime.

Going back to FIG. 1, as discussed above, computing device 104 or server 106 also includes compiler 114. Compiler 114 may receive source code as input and generate an executable that may execute on computing device 104 or server 106.

Figure 7:
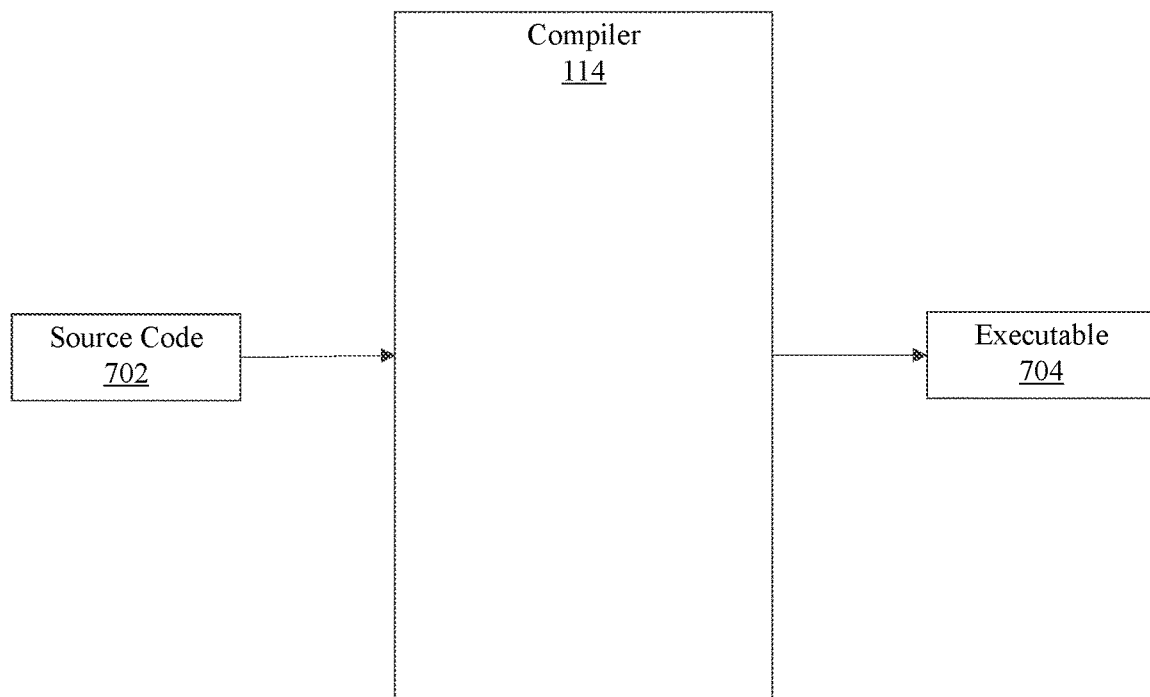
FIG. 7 is a block diagram of a compiler, according to an embodiment.

FIG. 7 is a block diagram 700 of a compiler, according to an embodiment. As illustrated in FIG. 7, compiler 114 may receive source code 702, e.g. source code for application 108 or 110, and generate a binary executable (or simply executable) 704 that may execute as application 108 or application 110. Typically, compiler 114 may compile source code 702 written in a particular programming language into executable 704.

In some embodiments, the source code 702 may include a function. Compiler 114 may compile the function as discussed with reference to FIGS. 8-12 below. For simplicity, the embodiments below are discussed with respect to a function, but the embodiments may be applicable to multiple functions, classes, etc., that may be included in source code 702. FIG. 8 is a diagram 800 of an example source code according to an embodiment. For illustration purposes, FIG. 8 shows a function 802 written in the source code in the C# programming language.

In some embodiments, once compiler 114 receives a source code that includes function 802, compiler 114 may split function 802 into one or more code sections, such as code sections 804A-D. An example code section may include a name of the function (code section 804A), a definition of a variable and/or initialization of the variable (code section 804B), an operation that is performed on a variable (code section 804C) and a variable that may be returned by the function (code section 804D). Compiler 114 may also divide the source code into other sections not shown in FIG. 8, such as code sections that include a control flow statements, decision statements, definitions of other functions, etc.

In some embodiments, compiler 114 may generate an ordered map. The ordered map represents an execution order of operations in function 802. To generate an ordered map, compiler 114 may initially generate nodes that include code sections 804A-D. In some embodiments, there may be one code section in code sections 804A-D per node. The nodes in the ordered map may be arranged such that the execution order of code sections 804A-D and operations within code sections 804A-D are preserved. In some embodiments, one or more edges may indicate an order in which the nodes are arranged in the ordered map such that the execution order of code snippets 804A-D is preserved.

FIG. 9 is a diagram 900 of an ordered map that includes nodes with code sections, according to an embodiment. FIG. 9 illustrates nodes 902A-D that include code sections 804A-D. In some embodiments there may be one node per code snippet, such that node 902A includes code section 804A, node 902B includes code section 804B, node 902C includes code section 804C, and node 902D includes code section 804D. Notably, code sections 804A-D in nodes 902A-D may be combined in parallel and independently of each other. In other words, each node in nodes 902A-D may transition from an uncompiled state to a compiled state independently of other nodes in nodes 902A-D.

In some embodiments, each node 902A-D may be in a key-value format, a key includes a node name and an order of the node in the map. The value may include a corresponding code section in code sections 804A-D.

In some embodiments, nodes 902A-D may be ordered or organized into an ordered map 904. The order of nodes 902A-D in map 904 may preserve the execution order of the code sections 804A-D in function 802. To preserve execution order, nodes 902A-D may include edges, such as edges 906A-B. Edges may preserve the order of nodes 902A-D by indicating how nodes 902A-D may be appended to each other. In other words, an edge can be a data structure that indicates the dependency between nodes in nodes 902A-D such that the order of operations among the nodes is preserved. As illustrated in FIG. 9, edges 906A-B may be included or appended to one or more nodes 902A-D or values in the key-value pair in nodes 902A-D. Edges 906A-B may further indicate the relationship among nodes 902A-D in map 904 and the order of nodes 902A-D. For example, edge 906 indicates that node 902B may be appended to node 902A, node 902C may be appended to node 902B, and node 902D may be appended to node 902C. In another example, edge 906A may indicate that code snippet 802A may be appended to another code snippet (not shown).

In some embodiments, compiler 114 may perform a lexical analysis on the code sections 804A-D in each node in nodes 902A-D. The lexical analysis on the code sections from each node, may be performed in parallel with other nodes 902A-D. In the lexical analysis, compiler 114 may divide words in a code section and assign tokens to a particular type to the word. With reference to the code section 804A "int f ( ) { }" in node 902A, lexical analysis may identify tokens that are "int", "f", "(", ")", "{" and "}" and assign respective types to the tokens that are "keyword", "identifier", "operator", "operator", "operator", and "operator." Compiler 114 may perform a similar lexical analysis on code sections 804B-D in nodes 902B-D in parallel with the analysis in node 902A.

After performing a lexical analysis on nodes 902A-D, compiler 114 may generate an abstract syntax tree (AST) that includes the identified tokens. The AST may describe the structure of the code snippet, including the order that the tokens may be combined in to perform the operations described in the code snippet. As with the lexical analysis, compiler 114 may generate an AST for each node in nodes 902A-D in parallel with other nodes in nodes 902A-D. For example, compiler 114 may generate an AST for node 902A in parallel with compiler 114 generating ASTs for nodes 902B-D.

In some embodiments, compiler 114 may generate a low-level code, such as assembly code (ASM), from the AST. To generate the low-level code, compiler 114 may walk through the branches of the AST tree and translate the tokens in the AST tree into the low-level code. Compiler 114 may generate the low-level code for each node in nodes 902A-D in parallel with other nodes in nodes 902A-D. For example, compiler 114 may generate the low-level code for the AST associated with node 902A in parallel with compiler 114 generating the low-level code for ASTs associated with nodes 902B-D. FIG. 10 is a diagram 1000 illustrating assembly code, according to an embodiment. As illustrated in FIG. 10, assembly code 1002A-1002D may be generated from ASTs associated with nodes 902A-D, such that the AST associated with node 902A generates assembly code 1002A, the AST associated with node 902B generates assembly code 1002B, the AST associated with node 902C generates assembly code 1002C, and the AST associated with node 902D generates assembly code 1002D.

In some embodiments, compiler 114 may determine that low-level code, such as assembly code 1002A and assembly code 1002D generated from ASTs associated with nodes 902A and 902D respectively, may overlap. When the code overlaps, compiler 114 may discard the assembly code from one of the nodes. As illustrated in FIG. 10, compiler 114 may discard assembly code 1002D.

From the non-overlapping assembly code, such as assembly codes 1002A-1002C, compiler 114 may generate one or more executable objects. Executable objects may be portions of a program or software that may be executed as executable 704 and are in a binary format. In some embodiments, compiler 114 may generate an executable object from each assembly codes 1002A-C in parallel with generating executable objects with other assembly codes in assembly codes 1002A-C. FIG. 11 is a diagram 1100 illustrating executable objects, according an embodiment. FIG. 11 illustrates executable objects 1102A-C, such that executable object 1102A is generated from assembly code 1002A associated with node 902A; executable object 1102B is generated from assembly code 1002B associated with node 902B; and executable object 1102C is generated from assembly code 1002C associated with node 902C. Notably, because compiler 114 identified the assembly code 1002D in FIG. 10 as overlapping with assembly code 1002D, compiler 114 does not generate an executable object from assembly code 1002D Notably, unlike conventional compilers, compiler 114 generates executable objects 1102A-C from the respective code sections 804A-D discussed in FIG. 8 in parallel with each other.

Once compiler 114 generates executable objects 1102A-C, compiler 114 may link the executable objects 1102A-C into executable 704. Executable 704 may be compiled code that may execute on computing device 104 as application 108 or server 106 as application 110. In some embodiments, executable objects 1102A-C may be linked according to the order identified in map 904. FIG. 12 is a diagram 1200 illustrating executable objects that are linked into an executable, according to an embodiment. As illustrated in FIG. 12, executable objects 1102A-C are linked into executable 704. Compiler 114 may link executable objects 1102A-C by mapping executable objects 1102A-C into a memory stack according to the order indicated in map 904. In addition to the executable objects 1102A-C, compiler 114 may also add one or more libraries 1204 to executable 704. Libraries 1204 may be libraries included or referenced by function 802. In addition, compiler 114 may include objects 1206 in executable 704. These objects may be referenced by the libraries 1204 or function 802. Once compiler 114 generates executable 704, executable 704 may execute on computing device 104 or server 106.

Compiler 114 is an improvement over conventional compilers because compiler 114 may divide source code, e.g. function 802, into multiple code sections 804A-D and compile code sections 804A-D into executable objects, e.g. executable objects 1102A-1102C, in parallel and then link executable objects 1102A-C together into executable 704, thus improving compilation time of source code 702. In some embodiments, compiler 114 may designate each code section in code sections 804A-D as having an uncompiled state, and the entire source code 702 as having a global uncompiled state. As compiler 114 compiles each code section in code sections 804A-D in one of executable objects 1102A-C, compiler 114 may switch the uncompiled state for the code section in code sections 804A-D from an uncompiled state to a compiled state. Once compiler 114 switches all code sections 804A-D into a compiled state, compiler 114 may link executable objects 1102A-C into executable 704 and switch the global uncompiled state to the global compiled state. Once compiler 114 switches the source code 702 to the global compiled state, executable 704 may execute on computing device 104 or server 106.

Figure 13:
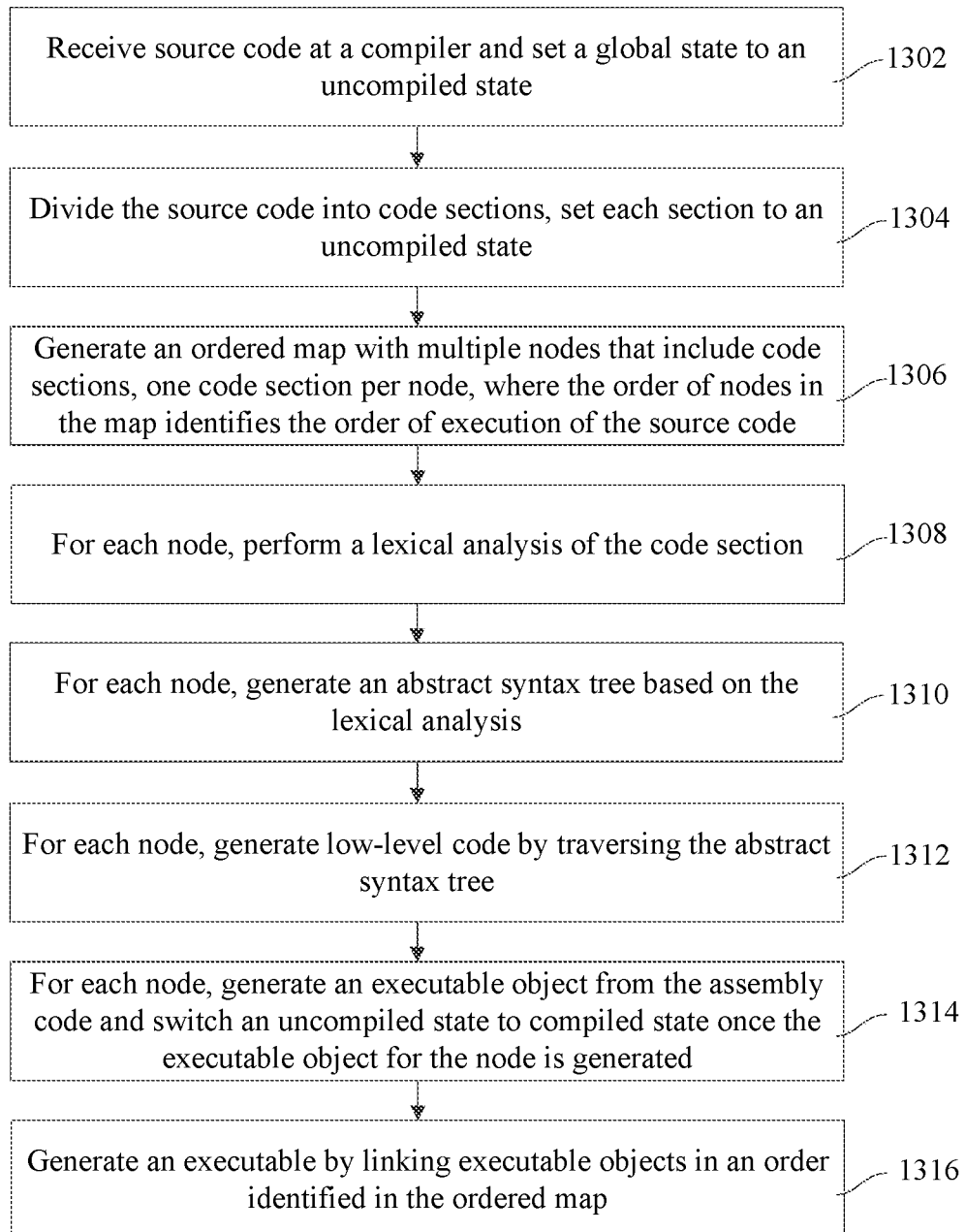
FIG. 13 is a flowchart of a method for compiling source code, according to an embodiment.

FIG. 13 is a flowchart of a method 1300 for compiling source code, according to an embodiment. Method 1300 may be performed using hardware and/or software components described in FIGS. 1 and 8-12. Note that one or more of the operations may be deleted, combined, or performed in a different order as appropriate.

At operation 1302, source code is received. For example, compiler 114 may receive source code 702 written in one of known software languages. An example of source code 702 may be function 802. Compiler 114 may also assign an uncompiled global state to the source code 702.

At operation 1304, source code is divided into code sections. For example, compiler 114 may divide source code 702, e.g. function 802, into multiple code sections 804A-D. As discussed above, example code sections 804A-D may be a function definition, a return statement, a variable definition, a variable initialization, an arithmetic function or a decision statement. Compiler 114 may also assign an uncompiled state to each code section 804A-D.

At operation 1306, an ordered map is generated. For example, compiler 114 may generate map 904 that includes nodes 902A-D, where each node in nodes 902A-D includes one of sections 802-D identified in operation 1304. Further, the nodes in map 904 are ordered according to the order of operations in the source code received in operation 1302. Nodes 902A-D may be ordered using one or more edges that are appended to nodes 902A-D.

Notably, operations 1308-1314 may be performed for each node 902A-D in parallel with other nodes in nodes 902A-D.

At operation 1308, a lexical analysis is performed. For example, compiler 114 may perform a lexical analysis on code sections 804A-D in nodes 902A-D. As discussed above, lexical analysis generates tokens from different words or symbols in code sections 804A-D, and assigns a type to the token which identifies whether the word or symbol is a keyword, operator, identifier, etc.

At operation 1310, ASTs are generated. For example, compiler 114 generates an AST from the tokens associated with each code section in code sections 804A-D. Typically, compiler 114 generates one AST for each code snippet.

At operation 1312, a low-level code is generated. For example, compiler 114 may generate assembly code or other low-level code from each AST. In some embodiments, compiler 114 may generate assembly code 1002A-D for code sections 804A-D by traversing the AST associated with each code section 804A-D. Further, as discussed above, compiler 114 may identify overlapping instructions in assembly code 1002A-D and remove the assembly code, such as assembly code 1002D that includes overlapping code with assembly code 1002A.

At operation 1314, executable objects are generated. For example, compiler 114 may generate executable objects 1102A-C from the respective assembly codes 1002A-C. Further, once compiler 114 generates one of executable objects 1102A-C, compiler 114 may switch the uncompiled state to a compiled state for the corresponding code section in code sections 804A-D. After compiler 114 generates all executable objects 1102A-C from assembly code 1002A-C, and switches all uncompiled states to compiled states, compiler 114 proceeds to operation 1316.

At operation 1316, an executable is generated. For example, compiler 114 generates executable 704. As discussed above, compiler 114 may generate executable 704 by linking executable objects 1102A-C in the order identified in ordered map 902. Compiler 114 may also include libraries identified in executable objects 1102A-C or other objects identified in executable objects 1102A-C into executable 704. After compiler 114 generates executable 704, compiler 114 may switch the global state to a compiled global state. As discussed above, executable 704 may be executed using computing device 104 or server 106.

The improvements over a conventional compiler may further be illustrated with reference to FIG. 8-12. Suppose, a conventional compiler receives a function 802 discussed in FIG. 8. The conventional compiler may initially perform a lexical analysis on the entire function 802. Notably, this is different from compiler 114 that initially divides function 802 into code sections 804A-D and generates an ordered map 904 that includes nodes 902A-D with code sections 804A-D (discussed in FIG. 9) and then performs the lexical analysis on each code section in code sections 804A-D in nodes 902A-D in parallel with other code sections in code sections 804A-D.

After the conventional compiler performs a lexical analysis on function 802, the conventional compiler may generate an abstract syntax tree (AST) for the code in function 802. Unlike compiler 114 that may generate an AST for each code section 804A-D in nodes 902A-D, the conventional compiler generates a single AST for the entire source code in function 802.

Using the AST, the conventional compiler may then generate low-level code, such as an assembly code. To generate the assembly code, the conventional compiler may traverse the branches of the AST and generate the assembly code based on the data or instructions that are stored in the nodes of the AST. Unlike compiler 114 that traverses multiple ASTs, such as ASTs associated with nodes 902A-D, and then traverses the multiple ASTs in parallel with each other, the conventional compiler traverses a single AST generated from the entire source code in function 802. Further, unlike the conventional compiler, compiler 114 may generate, as discussed in FIG. 10, separate assembly code 1002A-D for each one of nodes 902A-D, such that assembly code 1002A is generated for node 902A, assembly code 1002B for node 902B, etc.

Once the conventional compiler generates the low-level code for function 802, the conventional compiler may generate a single executable object from the assembly code. This is different from compiler 114 that generates, as discussed in FIG. 11, multiple executable objects 1102A-1102C from the assembly code 1002A-D that is associated with nodes 902A-C, such that object 1102A is generated from assembly code 1002A that is associated with node 902A, object 1102B is generated from assembly code 1002B that is associated with node 902B, etc. As discussed above, compiler 114 may generate objects 1102A-1102C in parallel with each other. Further, unlike the conventional compiler, compiler 114 may remove an overlapping assembly code, such as assembly code 1002A and 1002D and compile object 1102A from one of the overlapping nodes. Finally, unlike the conventional compiler, compiler 114 may switch the state of each object 1102A-C from an uncompiled state to a compiled state when compiler 114 generates each of objects 1102A-C irrespective of whether compiler 114 has completed compiling other objects in objects 1102A-C.

The conventional compiler may generate a binary executable from a single executable object, one or more libraries and objects that are not part of the source code but are referenced by the one or more libraries. Unlike the conventional compiler, compiler 114 may generate, as discussed in FIG. 12, binary executable 704 by combining multiple executable objects 1102A-C in an order identified by nodes 902A-D, one or more libraries 1204 and objects 1206 that may be referenced by libraries 1204. Also, unlike the conventional compiler, compiler 114 may transition the global uncompiled state for function 802 to a global compiled state when compiler 114 generates executable 704.

Figure 14:
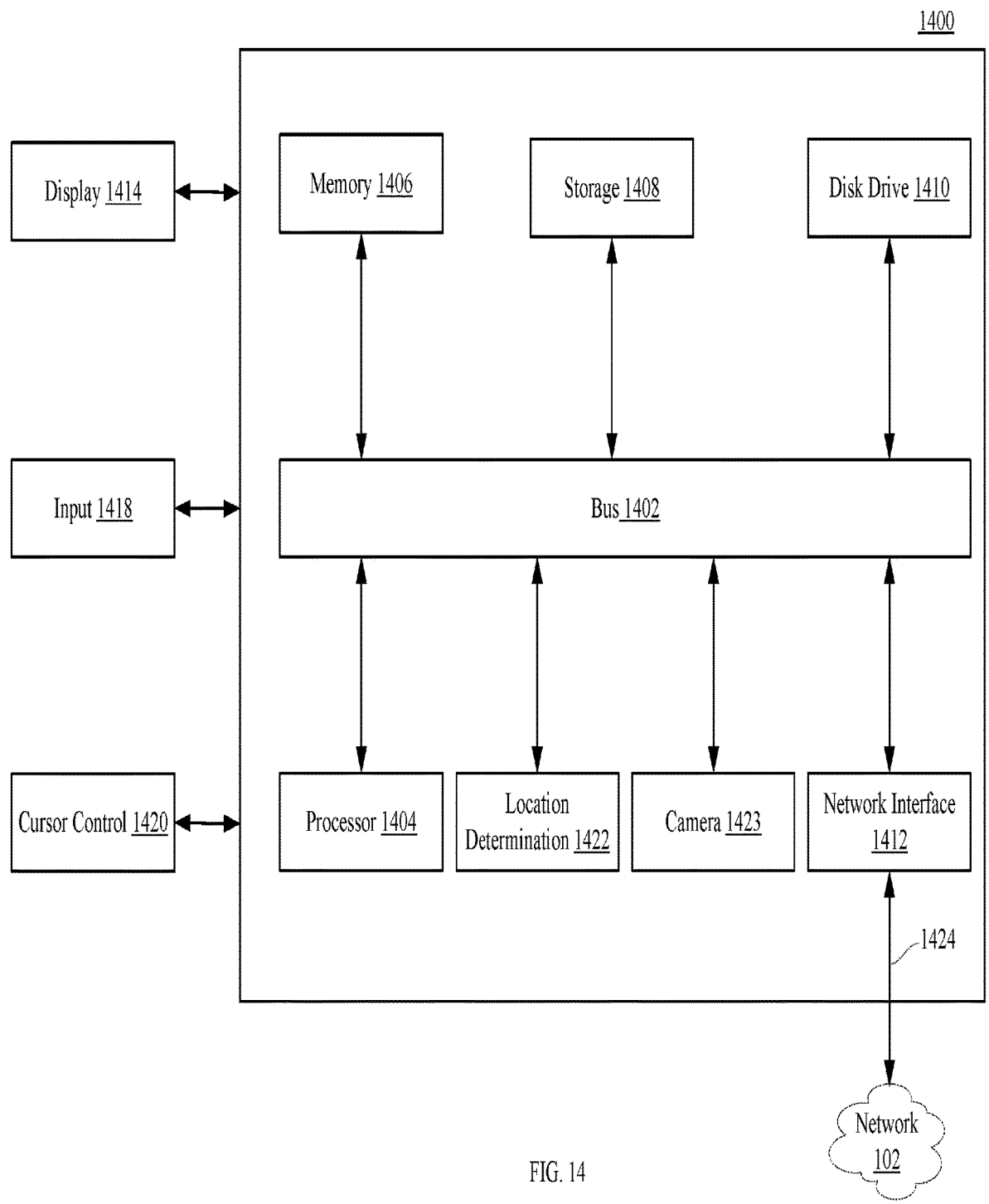
FIG. 14 is a block diagram of a computer system suitable for implementing one or more components or operations in FIGS. 1-13 according to an embodiment.

Referring now to FIG. 14 an embodiment of a computer system 1400 suitable for implementing, the systems and methods described in FIGS. 1-13 is illustrated.

In accordance with various embodiments of the disclosure, computer system 1400, such as a computer and/or a server, includes a bus 1402 or other communication mechanism for communicating information, which interconnects subsystems and components, such as a processing component 1404 (e.g., processor, micro-controller, digital signal processor (DSP), graphics processing unit (GPU), etc.), a system memory component 1406 (e.g., RAM), a static storage component 1408 (e.g., ROM), a disk drive component 1410 (e.g., magnetic or optical), a network interface component 1412 (e.g., modem or Ethernet card), a display component 1414 (e.g., CRT or LCD), an input component 1418 (e.g., keyboard, keypad, or virtual keyboard), a cursor control component 1420 (e.g., mouse, pointer, or trackball), a location determination component 1422 (e.g., a Global Positioning System (GPS) device as illustrated, a cell tower triangulation device, and/or a variety of other location determination devices known in the art), and/or a camera component 1423. In one implementation, the disk drive component 1410 may comprise a database having one or more disk drive components.

In accordance with embodiments of the disclosure, the computer system 1400 performs specific operations by the processor 1404 executing one or more sequences of instructions contained in the memory component 1406, such as described herein with respect to the mobile communications devices, mobile devices, and/or servers. Such instructions may be read into the system memory component 1406 from another computer readable medium, such as the static storage component 1408 or the disk drive component 1410. In other embodiments, hard-wired circuitry may be used in place of or in combination with software instructions to implement the disclosure.

Logic may be encoded in a computer readable medium, which may refer to any medium that participates in providing instructions to the processor 1404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1410, volatile media includes dynamic memory, such as the system memory component 1406, and transmission media includes coaxial cables, copper wire, and fiber optics, including wires that comprise the bus 1402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1400. In various other embodiments of the disclosure, a plurality of the computer systems 1400 coupled by a communication link 1424 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 1400 may transmit and receive messages, data, information and instructions, including one or more programs (i.e., application code) through the communication link 1424 and the network interface component 1412. The network interface component 412 may include an antenna, either separate or integrated, to enable transmission and reception via the communication link 1424. Received program code may be executed by processor 1404 as received and/or stored in disk drive component 1410 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method for compiling code, the method comprising:
   splitting, by a computer system, a software code into a plurality of code sections;
   generating a map of ordered nodes, wherein each of the ordered nodes is linked to at least one other of the ordered nodes by an edge, and wherein each of the ordered nodes corresponds to a particular respective code section of the plurality of code sections;
   independently compiling, at the computer system, a first code section in the plurality of code sections, and in parallel with compilation of remaining code sections, including a second code section, in the plurality of code sections, wherein the first code section corresponds to a first one of the ordered nodes and the second code section corresponds to a second one of the ordered nodes, wherein the compiling further comprises:
  performing a first lexical analysis of the first code section in the first one of the ordered nodes in parallel with a second lexical analysis of the second code section;
  generating a first abstract syntax tree for the first code section based on the first lexical analysis in parallel with generating a second abstract syntax tree for the second code section based on the second lexical analysis;
  generating first assembly code for the first code section from the first abstract syntax tree in parallel with generating second assembly code for the second code section from the second abstract syntax tree;
  generating a first executable object for the first code section from the first assembly code in parallel with generating a second executable object for the second code section from the second assembly code; and
  generating, at the computer system, an executable for the software code from the first executable object, the second executable object, and additional executable objects corresponding to other code sections in the map of ordered nodes, wherein an order of executable objects in the executable corresponds to an order of the ordered nodes in the map of ordered nodes.

2. The method of claim 1, wherein the software code is in a single computer file.

3. The method of claim 1, wherein the software code is within a single function defined in a particular programming language.

4. The method of claim 1, further comprising:
  prior to generating the executable, determining whether the first assembly code and the second assembly code have overlapping assembly code.

5. The method of claim 4, further comprising:
  based on the determination that the first assembly code and the second assembly code have the overlapping assembly code, removing the overlapping assembly code from the second assembly code prior to generating the second executable object.

6. The method of claim 1, wherein the map includes key-value pairs, wherein for a given node in the map, a key for that given node is included in the node and includes an order of the given node in the map, and a value for the given node is in a corresponding code section for the given node.

7. A non-transitory computer-readable medium having stored thereon instructions that are executable by a computer system to cause the computer system to perform operations comprising:
  splitting a software code into a plurality of code sections;
  generating a map of ordered nodes, wherein each of the ordered nodes is linked to at least one other of the ordered nodes by an edge, and wherein each of the ordered nodes corresponds to a particular respective code section of the plurality of code sections;
  independently compiling a first code section in the plurality of code sections, and in parallel with compilation of remaining code sections, including a second code section, in the plurality of code sections, wherein the first code section corresponds to a first one of the ordered nodes and the second code section corresponds to a second one of the ordered nodes, wherein the compiling further comprises:
    performing a first lexical analysis of the first code section in the first node in parallel with a second lexical analysis of the second code section;
    generating a first abstract syntax tree for the first code section based on the first lexical analysis in parallel with generating a second abstract syntax tree for the second code section based on the second lexical analysis;
    generating first assembly code for the first code section from the first abstract syntax tree in parallel with generating second assembly code for the second code section from the second abstract syntax tree;
    generating a first executable object for the first code section from the first assembly code in parallel with generating a second executable object for the second code section from the second assembly code; and
  generating an executable for the software code from the first executable object, the second executable object, and additional executable objects corresponding to other code sections in the map of ordered nodes, wherein an order of executable objects in the executable corresponds to an order of the ordered nodes in the map of ordered nodes.

8. The non-transitory computer-readable medium of claim 7, wherein the operations further comprise:
  initially assigning, prior to generating the executable, an uncompiled state to each node in the map; and
  changing the uncompiled state for each node in the map to a compiled state after the corresponding code section for that node has been compiled into an executable object.

9. The non-transitory computer-readable medium of claim 8, wherein the operations further comprise:
  changing a state for the executable from uncompiled to compiled after all code sections for all nodes in the map have been compiled into executable objects.

10. The non-transitory computer-readable medium of claim 7, wherein the operations further comprise:
  prior to generating the executable, determining whether the first assembly code and the second assembly code have overlapping assembly code.

11. The non-transitory computer-readable medium of claim 10, wherein the operations further comprise:
  based on the determination that the first assembly code and the second assembly code have the overlapping assembly code, removing the overlapping assembly code from the second assembly code prior to generating the second executable object.

12. The non-transitory computer-readable medium of claim 10, wherein the map includes key-value pairs, wherein for a given node in the map, a key for that given node is included in the node and includes an order of the given node in the map, and a value for the given node is in a corresponding code section for the given node.

13. The non-transitory computer-readable medium of claim 7, wherein one or more respective edges for each node in the map indicate an order by which nodes in the map can be appended to one another.

14. The non-transitory computer-readable medium of claim 13, wherein the one or more respective edges for each node in the map have a particular data structure to indicate dependencies among nodes in the map.

15. A computer system, comprising:
  a processor; and a non-transitory computer-readable medium having stored thereon instructions executable to cause the computer system to perform operations comprising:

splitting a software code into a plurality of code sections;

generating a map of ordered nodes, wherein each of the ordered nodes is linked to at least one other of the ordered nodes by an edge, and wherein each of the ordered nodes corresponds to a particular respective code section of the plurality of code sections;

independently compiling a first code section in the plurality of code sections, and in parallel with compilation of remaining code sections, including a second code section, in the plurality of code sections, wherein the first code section corresponds to a first one of the ordered nodes and the second code section corresponds to a second one of the ordered nodes, wherein the compiling further comprises:

performing a first lexical analysis of the first code section in the first one of the ordered nodes in parallel with a second lexical analysis of the second code section;

generating a first abstract syntax tree for the first code section based on the first lexical analysis in parallel with generating a second abstract syntax tree for the second code section based on the second lexical analysis;

generating first assembly code for the first code section from the first abstract syntax tree in parallel with generating second assembly code for the second code section from the second abstract syntax tree;

generating a first executable object for the first code section from the first assembly code in parallel with generating a second executable object for the second code section from the second assembly code; and generating an executable for the software code from the first executable object, the second executable object, and additional executable objects corresponding to other code sections in the map of ordered nodes, wherein an order of executable objects in the executable corresponds to an order of the ordered nodes in the map of ordered nodes.

16. The computer system of claim 15, wherein the operations further comprise:

initially assigning, prior to generating the executable, an uncompiled state to each node in the map; and changing the uncompiled state for each node in the map to a compiled state after the corresponding code section for that node has been compiled into an executable object.

17. The computer system of claim 16, wherein the operations further comprise:

changing a state for the executable from uncompiled to compiled after all code sections for all nodes in the map have been compiled into executable objects.

18. The computer system of claim 15, wherein the operations further comprise:

prior to generating the executable, determining whether the first assembly code and the second assembly code have overlapping assembly code.

19. The non-transitory computer-readable medium of claim 18, wherein the operations further comprise:

based on the determination that the first assembly code and the second assembly code have the overlapping assembly code, removing the overlapping assembly code from the second assembly code prior to generating the second executable object.

20. The computer system of claim 15, wherein one or more respective edges for each node in the map indicate an order by which nodes in the map can be appended to one another.

* * * * *